(No Model.)

A. BAUER.
VEHICLE WHEEL.

No. 473,812. Patented Apr. 26, 1892.

WITNESSES:
Jos. A. Ryan
Edw. W. Byrn

INVENTOR:
August Bauer
BY Munn & Co
ATTORNEYS

UNITED STATES PATENT OFFICE.

AUGUST BAUER, OF SANDUSKY, OHIO.

VEHICLE-WHEEL.

SPECIFICATION forming part of Letters Patent No. 473,812, dated April 26, 1892.

Application filed January 6, 1892. Serial No. 417,209. (No model.)

*To all whom it may concern:*

Be it known that I, AUGUST BAUER, of Sandusky, in the county of Erie and State of Ohio, have invented a new and useful Improvement in Vehicle-Wheels, of which the following is a specification.

The object of my invention is to strengthen the spokes of a vehicle-wheel, so as to prevent them from breaking, bending, or getting loose; and to this end it consists in two circular rings or flanges bolted together upon opposite sides of the spokes at a point between the hub and the felly and provided with intermediate filling blocks or sections, that form a continuous circular brace, as hereinafter fully described.

Figure 1:
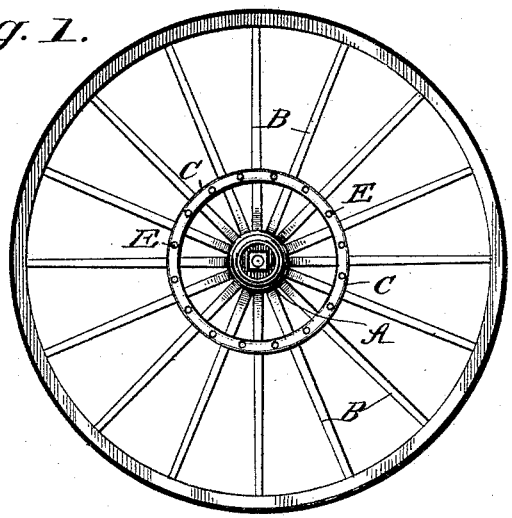
Figure 2:
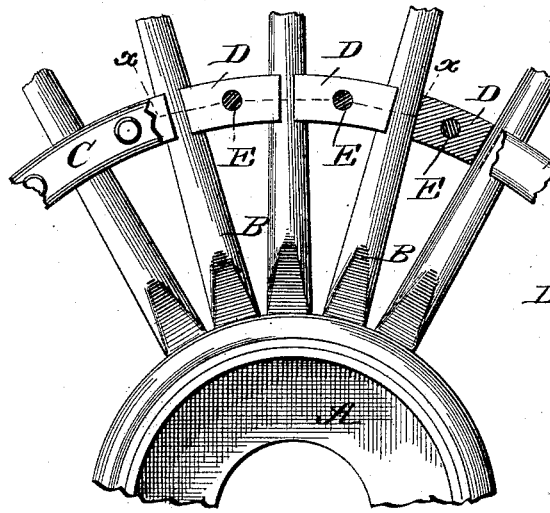
Figure 3:
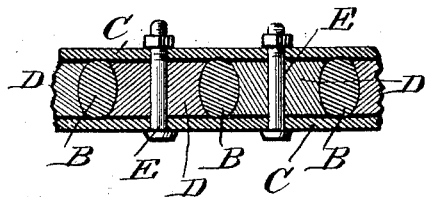

Figure 1 is a side view of a wheel constructed in accordance with my improvement. Fig. 2 is an enlarged side view of the hub and part of spokes, shown partly in section; and Fig. 3 is a section through line $x\ x$ of Fig. 2.

In the drawings, A represents the hub, and B are the spokes, which are constructed in the usual way.

C C are two circular rings or flanges of metal placed upon opposite sides of the spokes a few inches from the hub and concentrically arranged with reference thereto. Between these rings or flanges and filling in the spaces between the spokes are a series of filling blocks or sections D, whose ends are concaved to fit closely against the spokes and hold the same an equal distance apart. Through both the metal rings or flanges, and also through each of the filling blocks or sections, there passes a clamping-bolt and nut E or a rivet, which fastens the two rings and the intermediate blocks solidly together upon the spokes, forming a solid and substantial circular brace for the wheel, that is immovably fastened to the spokes outside of the hub. This brace does not cut nor impair the strength of the spokes in any way, and yet affords such strength to the wheel as to prevent the spokes from becoming loose, broken, or bent, avoiding the springing of any one spoke, and preventing, also, the dishing of the wheel. This circular brace may be placed at any point along the line of the spoke to suit the purpose of the manufacturer; but the distance of a few inches from the hub will be found to give sufficient strength without producing any unsightly effect.

I am aware of the fact that circular braces have been applied to the spokes of a wheel between the hub and the felly heretofore, being for the most parts incorporated with and forming a part of a special construction of wheel. I therefore make no broad claim to such circular brace.

My construction of devices is not confined to any particular construction of wheel; but may be applied to any old wheel already in use to supplement its strength and longevity, and is of a very simple and practical construction, the two rings or flanges C being exactly alike and the filling-blocks D being all exactly alike, so that no expensive patterns are required.

Having thus described my invention, what I claim as new is—

The combination, with a wheel, of a circular brace fastened to the wheel at a point between the hub and felly and consisting of two circular rings or flanges C C, with intermediate filling blocks or sections D, arranged between the spokes, and bolts or rivets clamping the rings and filling-blocks together, substantially as shown and described.

AUGUST BAUER.

Witnesses:
T. H. BAUER,
DANIEL AREND.